J. W. SNEDEKER.
PICKET FORMING MACHINE.
APPLICATION FILED JUNE 13, 1912.

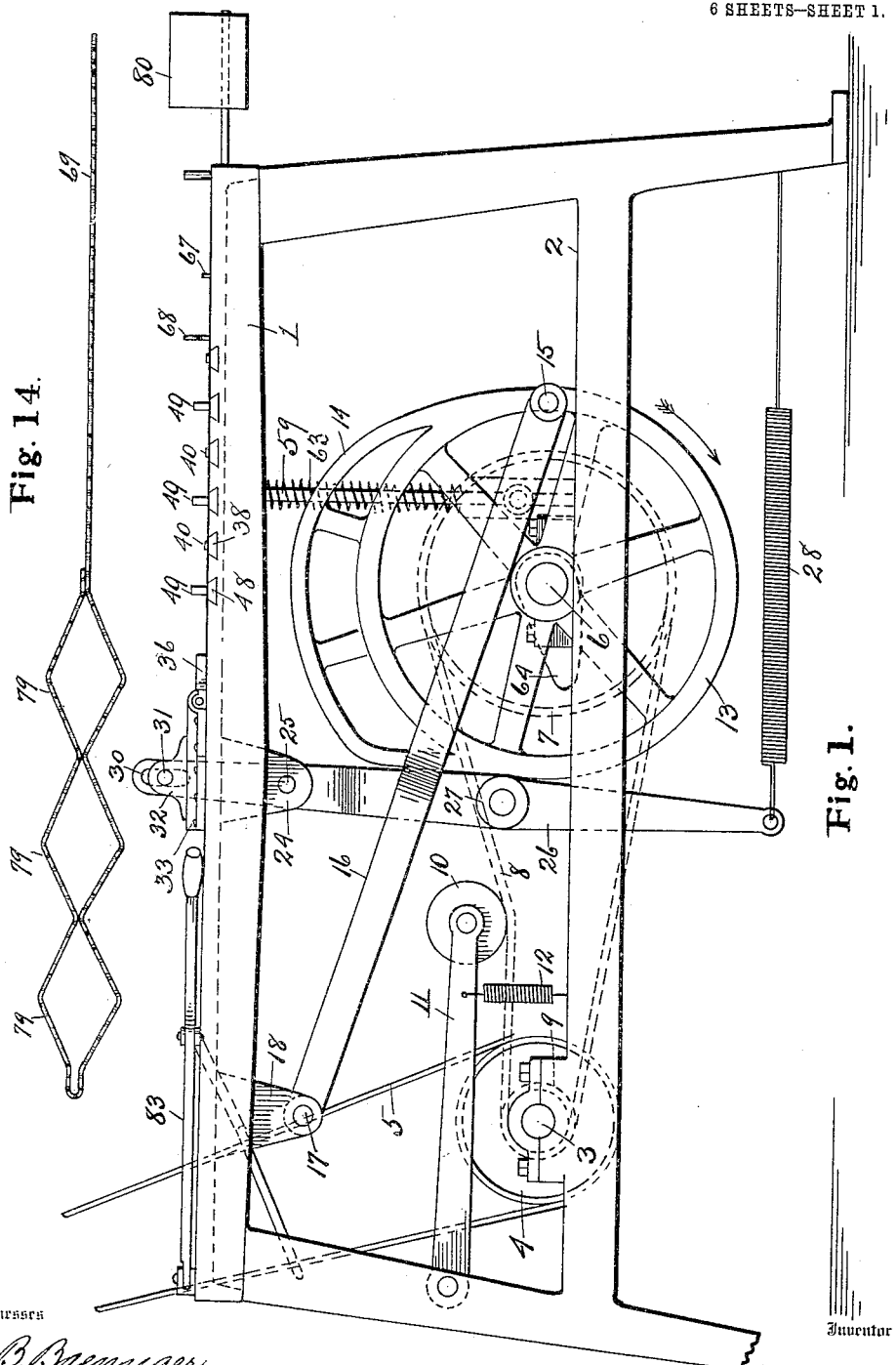

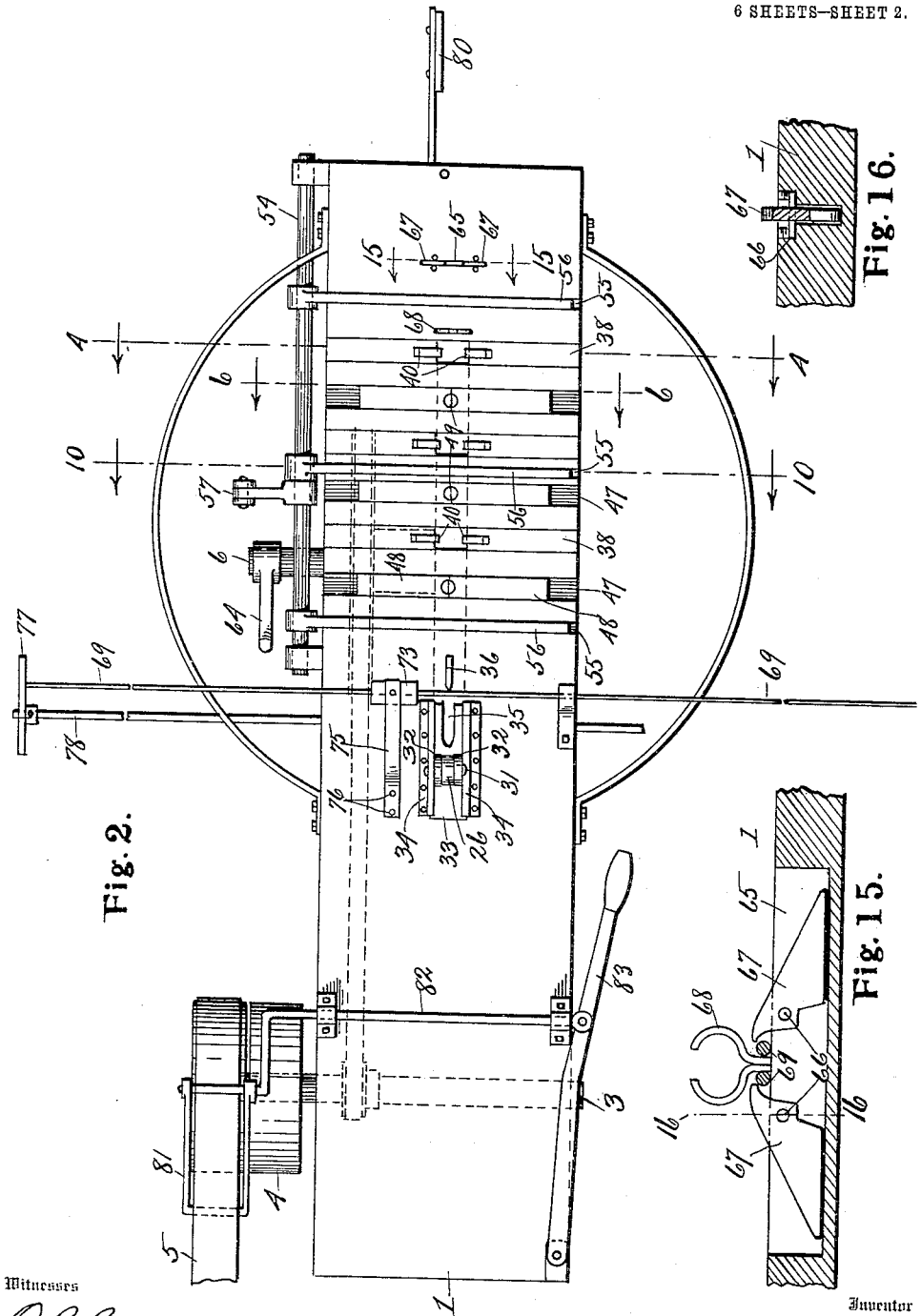

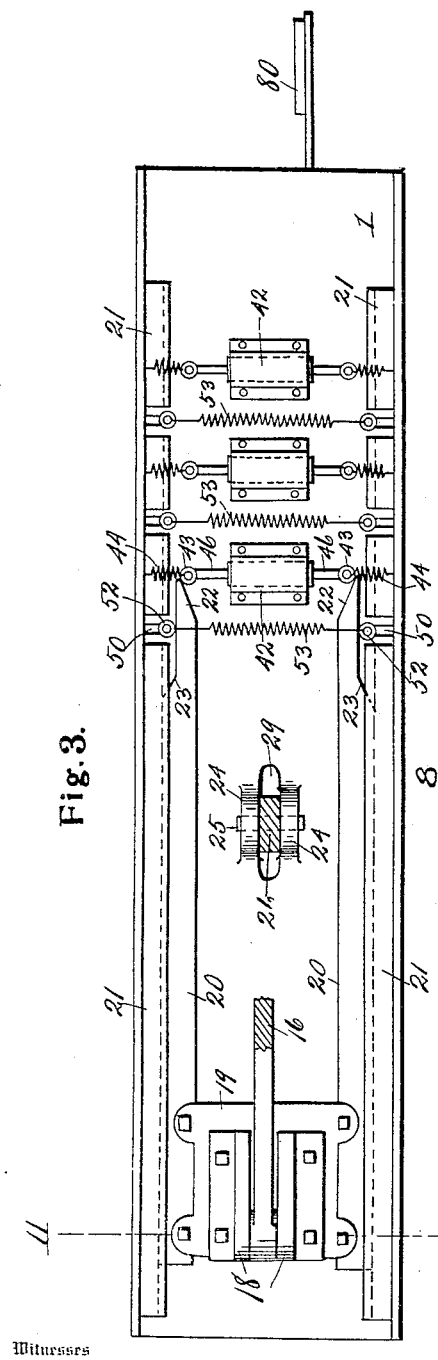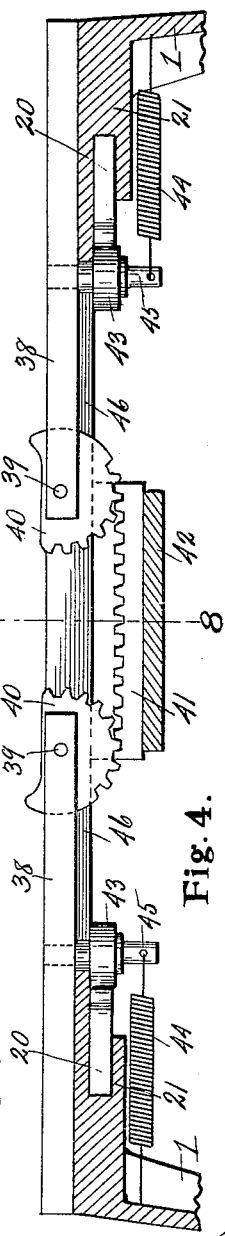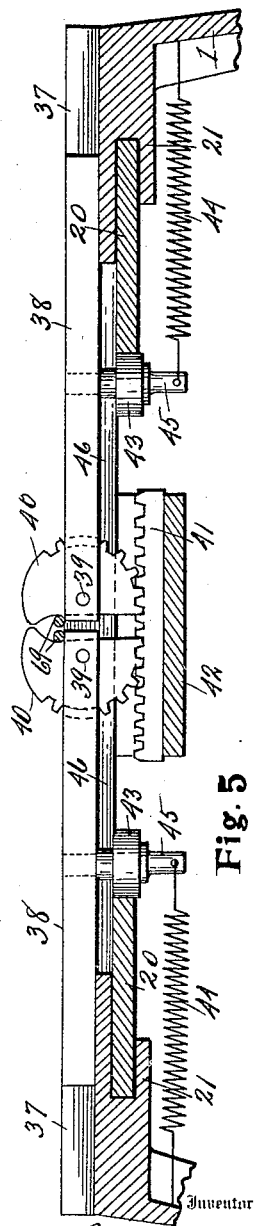

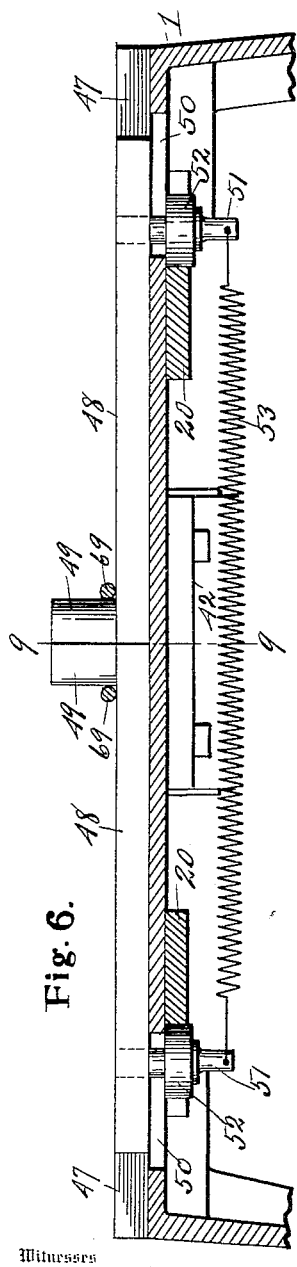
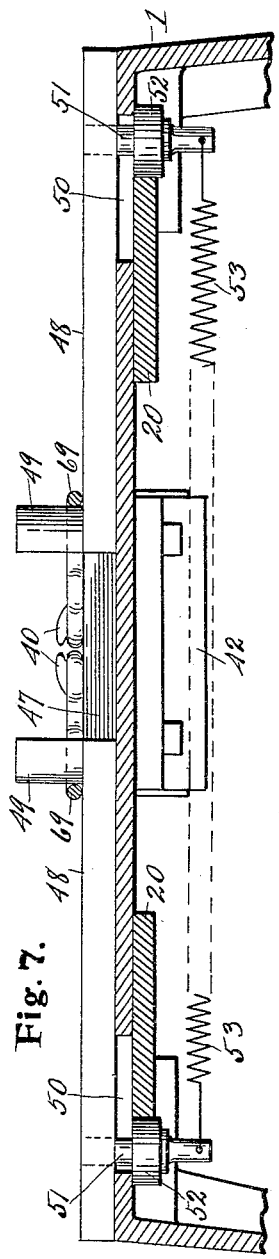
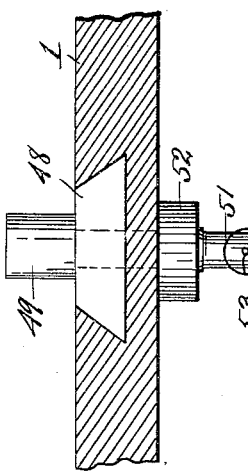
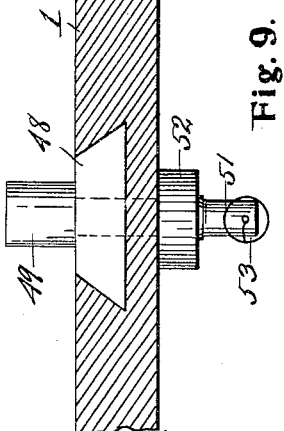

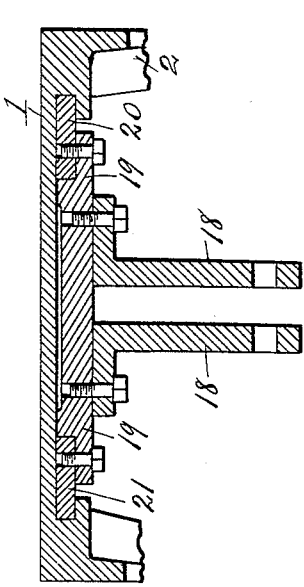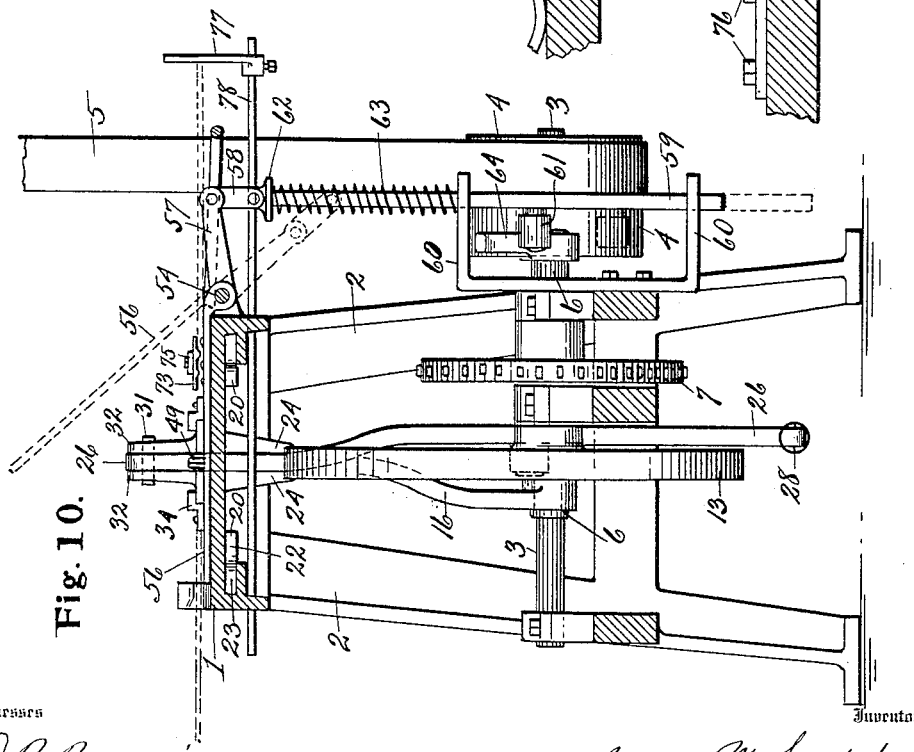

1,056,225.

Patented Mar. 18, 1913.

6 SHEETS—SHEET 6.

Witnesses
O. B. Baenziger
J. Otto Baenziger

Inventor
James W. Snedeker
By E. S. Wheeler
Attorney

UNITED STATES PATENT OFFICE.

JAMES W. SNEDEKER, OF ADRIAN, MICHIGAN.

PICKET-FORMING MACHINE.

1,056,225.

Specification of Letters Patent.   Patented Mar. 18, 1913.

Application filed June 13, 1912.   Serial No. 703,460.

*To all whom it may concern:*

Be it known that I, JAMES W. SNEDEKER, a citizen of the United States, residing at Adrian, in the county of Lenawee, State of Michigan, have invented certain new and useful Improvements in Picket-Forming Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a picket forming machine for ornamental wire fencing, and consists in the construction and arrangement of parts hereinafter more fully set forth and pointed out particularly in the claims.

The object of the invention is to provide simple and efficient means for forming a looped ornamental picket from a crimped metallic strand, provision being made for automatically operating the machine and for discharging the formed picket therefrom.

Figure 17:
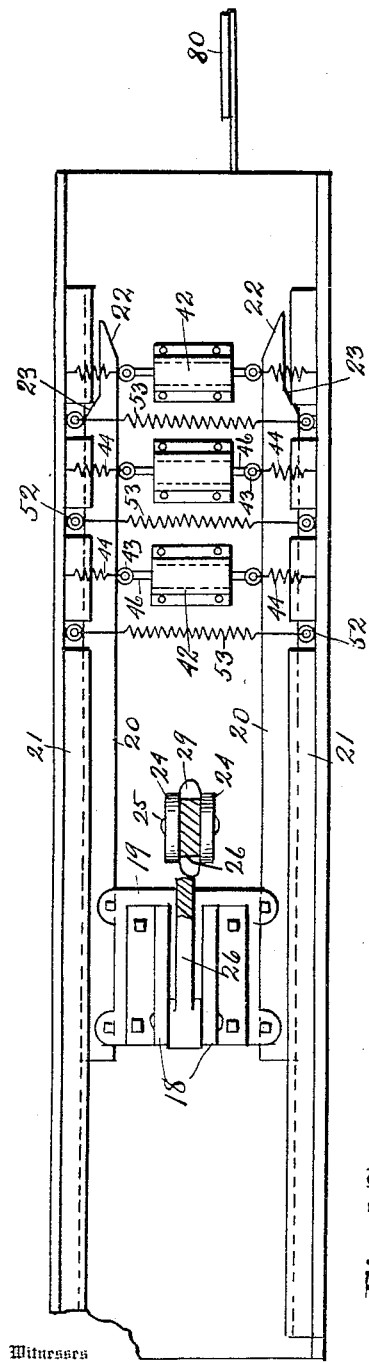
Figure 18:
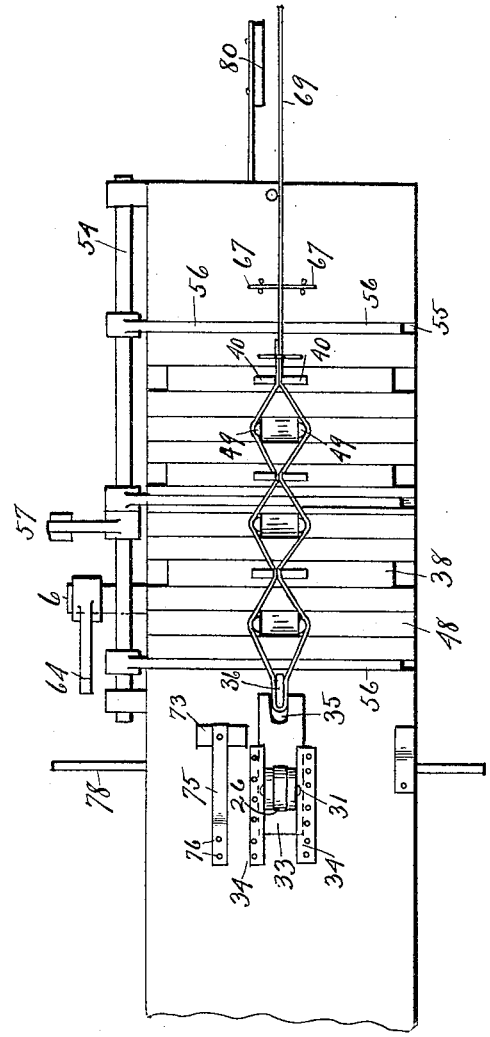

The above object is attained by the mechanism illustrated in the accompanying drawings, in which:

Figure 1 is a side elevation of a machine embodying my invention. Fig. 2 is a top plan view thereof. Fig. 3 is an inverted plan of the bed of the machine and the mechanism mounted thereon, parts being broken away. Fig. 4 is an enlarged transverse section through the machine, as on line 4—4 of Fig. 2, showing the parts in their normal position. Fig. 5 is a similar view showing the parts in their actuated position. Fig. 6 is a transverse section as on line 6—6 of Fig. 2, showing the parts in their normal position. Fig. 7 is a similar view showing the parts in their actuated position. Fig. 8 is a detail in transverse section as on line 8—8 of Fig. 4. Fig. 9 is a detail in transverse section as on line 9—9 of Fig. 6. Fig. 10 is a transverse section as on line 10—10 of Fig. 2. Fig. 11 is an enlarged view in transverse section as on line 11—11 of Fig. 3. Fig. 12 is an enlarged longitudinal section through the guide members which hold the crimped strand in position in the machine prior to the forming operation. Fig. 13 is a transverse section as on line 13—13 of Fig. 12. Fig. 14 is a plan view of a completed picket. Fig. 15 is a fragmentary view in section as on line 15—15 of Fig. 2. Fig. 16 is a transverse section as on line 16—16 of Fig. 15. Fig. 17 is an inverted plan of the bed of the machine similar to Fig. 3, showing the parts in the operated position. Fig. 18 is a top plan similar to Fig. 2, showing the parts for forming the picket in the operated position, other parts being broken away.

Referring to the drawings, by the characters of reference marked thereon, 1 designates the bed of the machine and 2 the supporting frame thereof. Journaled transversely of the frame is the main shaft 3, carrying a pulley 4 driven by a belt 5 from any suitable source of power, not shown. Also journaled in the frame is a short transverse shaft 6, carrying a sprocket wheel 7, over which passes a sprocket chain 8 from a smaller sprocket wheel 9 (see Fig. 1) on the shaft 3, said sprocket chain being held at the proper tension by the idler 10, journaled at the outer end of the pivoted arm 11. Connected to said arm is a coiled spring 12 which maintains said idler in yielding contact with the chain. Also mounted upon the short shaft 6 is a large wheel 13, carrying upon a portion of the periphery thereof a cam 14. Journaled at one end on the pin 15, set in the perimeter of the wheel 13, is a pitman 16, the opposite end of said pitman being pivoted at 17 between the depending ears 18 on the under side of a frame 19 bolted to the under faces of the longitudinal movable cam-bars 20 (see Fig. 3) mounted to slide in guides 21 extending longitudinally of the bed on each side thereof. Each of the bars 20 is provided at its forward end with an inclined cam-face 22, and in the rear of the cam 22 with an oppositely inclined cam-face 23, for purposes hereinafter explained.

Depending from the under face of the bed near the center thereof are the ears 24, between which is fulcrumed at 25 a vertically depending lever 26 carrying upon the side thereof an anti-friction roller 27. Attached to the lower end of the lever 26 and to the frame is a retractory spring 28. The lever 26 is so disposed as to cause the anti-friction roller 27 thereon to extend into the path of travel of the cam 14 on the wheel 13, whereby, as said wheel revolves, the lever 26 is actuated on its fulcrum in one direction by the cam 14, and in the other direction by the spring 28. The upper end of the lever 26 extends through a slot 29 (see Fig. 3) in the bed and is provided with a slot 30 (see Fig. 1) to receive a transverse pin 31 which passes therethrough and is mounted at its ends in the parallel ears 32, between which the end of said lever lies and which are mounted upon a sliding plate 33 on the upper face of the bed, held in place by the flanged guide strips 34 embracing the opposite edges thereof, as shown in Fig. 2. In the front edge of the sliding plate 33 is a U-shaped recess 35, the purpose of which will be hereinafter explained. Rigidly mounted in the bed of the machine is a forming member 36, adapted to be received in the U-shaped recess in the plate 33, as said plate slides forward.

Mounted in transverse channels 37 in the upper face of the bed (see Fig. 5) are slide bars 38, which are arranged in pairs in axial alinement and which are dove-tailed in the channels 37, as shown in Fig. 8, to retain them properly in place. Journaled in a slot in the inner end of each of the bars 38 upon a transverse pin 39 is a mutilated gear 40, the teeth of which are at all times in mesh with a stationary rack 41, held in a channeled plate 42 bolted to the under face of the bed, as clearly shown in Fig. 8. Depending from the under side of each of the bars 38 is an anti-friction roller 43, adapted to lie against the edge of the cam-bar 20 and being constantly urged outwardly against said bar by means of a coiled spring 44, attached at one end to the journal pin 45 of said roller and at the other end to the frame. There are three pairs of the bars 38, as illustrated herein, which are adapted to be actuated in pairs in sequential order by a longitudinal movement of the cam-bars 20. As the cam-bars 20 move forward, the cam faces 22 thereof engage the anti-friction rollers 43, and slide the bars 38 inwardly, thereby imparting a rocking motion to the mutilated gears 40 which are in engagement with the stationary rack 41, as illustrated in Fig. 5. Upon a return movement of the cam-bars 20, the springs 44 return the bars 38 to their normal position, as shown in Fig. 4. Facility of movement is afforded the bars 38 because of the open slots 46 in the bed through which the gears 40 extend and in which the journal pins 45 of the anti-friction rollers are adapted to slide. Also crossing the bed transversely and located in dove-tailed channels 47 therein are the slide-bars 48, which are also arranged in pairs to reciprocate longitudinally. Upon the inner end of each of the bars 48 is an upwardly extending half-round post 49. Secured to the outer end of each of the bars 48 and depending from the under face thereof through a transverse slot 50 in the bed (see Figs. 6 and 7) is a journal pin 51, carrying an anti-friction roller 52, adapted to engage the outer edge of the cam-bars 20 and to be actuated by the cam faces 23 of said cam-bars as they move longitudinally. Extending between and connecting the lower ends of the journal pins 51 of the anti-friction rollers 52 is a coiled spring 53, whose tension is normally exerted to draw the inner ends of the slide-bars 48 together and hold them in the position shown in Fig. 6. There are three pairs of the slide-bars 48, as herein shown, which are actuated in pairs in sequential order by the cam-faces 23 on said cam-bars which engage the anti-friction rollers 52 and simultaneously slide the bars 48 of each pair outwardly against the action of the spring 53, said spring returning the bars 48 to their normal position upon a return movement of the cam-bars.

Journaled to the bed parallel with one of the side edges thereof is a rock-shaft 54. (See Figs. 2 and 10). Fast to said shaft and normally lying in transverse channels 55 in the bed are the arms 56. Also fast to the shaft 54 is a crank-arm 57, to the outer end of which is pivoted a link 58. To the lower end of the link 58 is pivoted the upper end of a vertically reciprocatory rod 59, the lower end of which passes through a forked guide 60. Journaled on the rod 59 to project therefrom is an anti-friction roller 61. Confined between a collar 62 on the upper end of the rod 59 and a member of the guide 60 is a coiled spring 63. Fast to the shaft 6 is a trip-arm 64, into the path of which the anti-friction roller 61 extends, so that once during each rotation of the shaft 6, said arm will engage said roller to depress the rod 59 and rock the shaft 54 to swing the arms 56 upwardly to the position shown by dotted lines in Fig. 10.

Pivoted in a slotted opening 65 in the bed upon the pins 66 are the gravity detents 67, shown in Fig. 15, the purpose of which is to engage and hold the side members of the looped portion of the picket when swung inwardly against the forked stop member 68, which is set in the bed adjacent said detents. The strands 69, from which the pickets are formed, are crimped or corrugated, as clearly shown in Fig. 12. These strands are fed into the machine transversely thereof through a suitable guide, comprising a lower plate 70, the upper face of which is provided with extending teeth 71 and interdental spaces 72, more clearly shown in Fig. 12, and an upper plate 73 having on its under face teeth 74, adapted to register with the interdental spaces 72 of the lower plate. The upper plate 73 is mounted upon the free end of a spring arm 75, which is bolted at 76 to the bed, and which curves upwardly to suspend the upper plate 73 over the lower plate 70. When a crimped strand 69 is entered between the guide plates, the teeth and interdental spaces thereof receive the crimps or corrugations of said strand and cause said strand to lie with the deflections thereof in a vertical plane, a position in which it is desired that the strand shall lie when the picket is formed. To regulate the length of the loop of the picket, the end thereof is carried into engagement with a stop 77, adjustably mounted on the end of the supporting rod 78. The pickets are fed into the machine at a time when in the operation thereof the parts are in the position shown in Fig. 2, in which position, as the machine continues to operate, the sliding plate 33 will be actuated through the medium of the lever 26 and the cam 14 on the wheel 13 and will move forward so as to embrace the forming member 36 within the U-shaped recess 35 therein, thereby bending the strand 69 around said member into the form of a loop and causing the sides thereof to lie in parallelism longitudinally of the bed. As the terminal portions of the strand swing together in this operation, they strike and depress the upper ends of the detents 67, and are finally arrested by the stop member 68 at which time the sides of the looped strand having passed the inner ends of the detents, the outer weighted ends thereof will drop, causing said inner ends to engage partially over the sides of the looped portion of the picket, and in conjunction with the forked stop member 68, confine them in place, as shown in Fig. 15, to extend longitudinally of the bed. In this position the side members of the looped portion of the strand lie across the gear members 40 of the slides 38 and cross the slides 48 beside the half-round posts 49 thereof.

As the machine continues its operation, the cam-bars 20 are actuated through the medium of the pitman 16 to cause the cam-faces 22 thereof to sequentially engage the anti-friction rollers 43, and actuate the slide bars 38 simultaneously in pairs to cause the gears 40 pivoted between the inner ends thereof to rotate as said bars move inwardly, and confine the parallel sides of the looped portion of the picket between the embracing faces of said gears as they roll toward each other, as shown in Fig. 5. A further longitudinal movement of the cam-bars 20 in the same direction will cause the cam-faces 23 thereon to sequentially engage the anti-friction rollers 52 on the slide-bars 48, and move said bars outwardly in pairs so as to cause the posts 49 at the inner ends thereof to spread the side portions of the looped part of the strand or picket, as clearly shown in Figs. 7 and 18, and form the diamond-shaped sections 79 at the upper end of the picket, as clearly shown in Fig. 14. As the actuation of the pairs of slides 48 follows sequentially, the side portions of the strand are permitted to draw through the confining gears 40' to allow for the forming of each of the diamond-shaped sections 79 without danger of breaking the side members or subjecting them to an excessive longitudinal strain. After the completion of the formation of the picket, the cam-bars 20 are retracted by the operation of the pitman 16, thereby restoring the parts to their normal position, at which time the trip-arm 64 encounters the anti-friction roller 61 on the rod 59, thereby actuating said rod to rock the shaft 54 and cause the arms 56 to swing upwardly and discharge the formed picket from the machine. After the arm 64 shall have passed from engagement with the anti-friction roller 61, the spring 63 restores the rod 59 to its former position and rocks the shaft 54 to cause the arms 56 to swing downwardly into their receiving channels in the bed of the machine, in which position the parts are in readiness for a succeeding operation.

For the purpose of preventing the ends of the side members of the strand from which the picket is formed lapping each other and becoming entangled, a guard plate 80 is secured to the rear of the bed to stand between the terminals of the looped portion of the strand, thus preventing the entanglement thereof when their terminal portions are swung together by the operation of the plate 33 in forming the loop of the picket.

Provision is made for shifting the driving belt 5 through the medium of a bail 81, which embraces said belt and is connected to a transversely movable rod 82, which crosses the bed and is pivotally connected to a lever 83 which is in turn pivoted to the frame.

Having thus fully set forth my invention, what I claim as new and desire to secure by Letters Patent is:—

1. A picket forming machine, comprising means for looping the picket strand, grasping members for holding the parallel sides of the looped portion at intervals, and means for sequentially separating the side members of the looped portion between said grasping members.

2. A picket forming machine, comprising means for looping the picket strand, means for holding the parallel sides of the looped portion at intervals, means for sequentially separating the side members of the looped portion between said holding members, and means for discharging the formed picket from the machine.

3. In a picket forming machine, means for bending the picket strand to cause the portions thereof to lie in parallelism, means for clamping together the parallel portions of the strand at intervals, and means for separating the parallel portions between the clamping members to form the looped portion of the picket into a plurality of diamond-shaped figures.

4. In a picket forming machine, means for bending a picket strand to form parallel portions, means for clamping the parallel portions together at intervals, means for separating the parallel portions between two of the clamping devices to form oppositely disposed lateral bends therein, and means for discharging the formed picket from the machine.

5. In a picket forming machine, means for bending the picket strand to cause parts thereof to lie in parallel relation, slides carrying members adapted to embrace and confine the parallel portions of the strand at intervals, slides carrying separating members adapted to be actuated to separate the parallel strands between the confining members, and means for actuating the slides carrying the confining members and the slides carrying the separating members.

6. In a picket forming machine, means for bending a strand to form a loop therein and to cause portions of the strand to lie in parallel relation, slides carrying confining members adapted to embrace the parallel portions of the strand at intervals, slides carrying separating members adapted to engage and separate the parallel portions of the strand between said engaging members, reciprocatory cam-bars for actuating said slides, means for reciprocating the cam-bars at predetermined intervals, and means for moving the slides in a direction opposite to that in which they are actuated by the cam-bars.

7. In a picket forming machine, means for causing portions of the picket strand to lie in parallelism, spaced clamping means for holding the parallel portions of the picket together, and means for separating the parallel portions of the picket between said clamping means.

8. In a picket forming machine, means for forming a loop in the picket strand and for causing portions of the picket extending from said loop to lie in parallelism, means for clamping together the parallel portions of the strand at intervals, and means for separating the parallel portions of the picket between the clamping members.

9. In a picket forming machine, means for bending a picket strand to form parallel portions, a stop for arresting the parallel portions of the picket when brought into parallelism, gravity detents for confining said parallel portions against said stop, means for clamping the parallel portions of the picket together at intervals, and means for separating the parallel portions of the picket between said clamping devices.

10. In a picket forming machine, means for bending the picket strand to cause portions thereof to lie in opposed relation, members for holding the opposed portions of the strand at intervals, and reciprocatory slides for bending the opposed portions of the strand between said holding members.

In testimony whereof, I sign this specification in the presence of two witnesses.

JAMES W. SNEDEKER.

Witnesses:
 GEO. L. BENNETT,
 F. E. OSGOOD.

---

Copies of this patent may be obtained for five cents each, by addressing the "Commissioner of Patents, Washington, D. C."